(12) United States Patent
Egedal

(10) Patent No.: US 11,181,099 B2
(45) Date of Patent: Nov. 23, 2021

(54) DETERMINING A WIND TURBINE TOWER INCLINATION ANGLE

(71) Applicant: Siemens Gamesa Renewable Energy A/S, Brande (DK)

(72) Inventor: Per Egedal, Herning (DK)

(73) Assignee: SIEMENS GAMESA RENEWABLE ENERGY A/S

(*) Notice: Subject to any disclaimer, the term of this patent is extended or adjusted under 35 U.S.C. 154(b) by 96 days.

(21) Appl. No.: 16/336,181

(22) PCT Filed: Aug. 11, 2017

(86) PCT No.: PCT/EP2017/070397
§ 371 (c)(1),
(2) Date: Mar. 25, 2019

(87) PCT Pub. No.: WO2018/065144
PCT Pub. Date: Apr. 12, 2018

(65) Prior Publication Data
US 2020/0018290 A1  Jan. 16, 2020

(30) Foreign Application Priority Data
Oct. 7, 2016  (DE) ............ 10 2016 219 498.4

(51) Int. Cl.
*F03D 17/00* (2016.01)
*G01C 9/06* (2006.01)

(52) U.S. Cl.
CPC ............ *F03D 17/00* (2016.05); *G01C 9/06* (2013.01); *F05B 2270/329* (2013.01); *F05B 2270/807* (2013.01)

(58) Field of Classification Search
CPC .... F03D 7/0212; F03D 7/0224; F03D 7/0264; F03D 7/0268; F03D 17/00
See application file for complete search history.

(56) References Cited

U.S. PATENT DOCUMENTS

| | | | |
|---|---|---|---|
| 6,640,609 B1* | 11/2003 | Nadkarni | G01P 21/00 73/1.37 |
| 8,366,389 B2* | 2/2013 | Hoffmann | F03D 7/0292 416/1 |
| 9,797,376 B2* | 10/2017 | Bowyer | B63B 39/00 |
| 9,869,548 B2* | 1/2018 | Heining | G01C 9/02 |

(Continued)

FOREIGN PATENT DOCUMENTS

| | | |
|---|---|---|
| CN | 203604116 U | 5/2014 |
| CN | 105041584 A | 11/2015 |

OTHER PUBLICATIONS

Non-English Chinese Office Action for Application No. 201780061908. 5, dated Dec. 18, 2019.

(Continued)

*Primary Examiner* — Justin D Seabe
(74) *Attorney, Agent, or Firm* — Schmeiser, Olsen & Watts LLP

(57) ABSTRACT

Provided is a method of determining an inclination angle of a wind turbine tower at which a nacelle is mounted, the method including measuring plural acceleration values of an acceleration of the nacelle in a predetermined direction relative to the nacelle for plural yawing positions of the nacelle; deriving the inclination angle based on the plural acceleration values.

11 Claims, 2 Drawing Sheets

(56) References Cited

Figure 1:
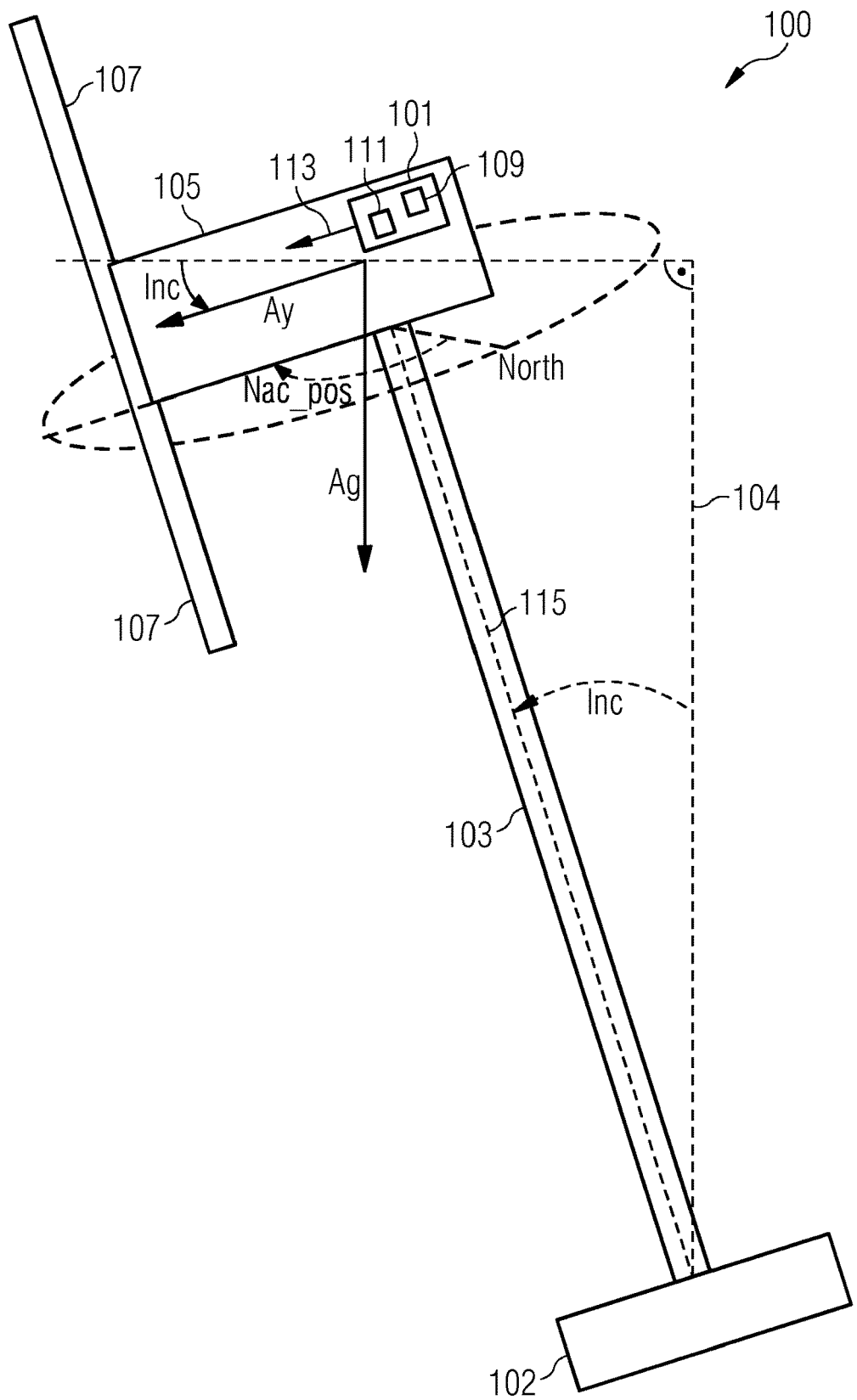

U.S. PATENT DOCUMENTS 10,519,929 B2* 12/2019 Hiremath .............. F03D 7/0204
2014/0316740 A1 10/2014 Heining
2019/0265097 A1* 8/2019 Muller .................. G01P 15/093

OTHER PUBLICATIONS

PCT International Search Report and Written Opinion of International Searching Authority dated Nov. 6, 2017 corresponding to PCT International Application No. PCT/EP2017/070397 filed Aug. 11, 2017.

* cited by examiner

DETERMINING A WIND TURBINE TOWER INCLINATION ANGLE

CROSS-REFERENCE TO RELATED APPLICATIONS

This application claims priority to PCT Application No. PCT/EP2017/070397, having a filing date of Aug. 11, 2017, based off of German Application No. 10 2016 219 498.4, having a filing date of Oct. 7, 2016, the entire contents both of which are hereby incorporated by reference.

FIELD OF TECHNOLOGY

The following relates to a method and to an arrangement for determining an inclination angle of a wind turbine tower and further relates to a method of monitoring a wind turbine.

BACKGROUND

The inclination of wind turbine towers may be required to stay within some narrow tolerances to keep loads from gravity at sufficiently low values, in particular to keep the loads at a minimum. Over operation time of the wind turbine, the inclination of the wind turbine tower may change due to changes in the underground, in the basement or the settling of the foundation.

Therefore, the inclination of the wind turbine tower may be required to be measured and monitored to ensure that the tower is installed correctly and stays in required inclination tolerances and also to ensure the integrity of the foundation and to detect an unacceptable inclination.

Conventionally, the inclination of a wind turbine tower has been measured manually by digital spirit levels or triangulation. These methods are time-consuming, cumbersome and do not provide sufficient accuracy in all circumstances.

Thus, there may be a need for a method and for an arrangement of determining an inclination angle of a wind turbine tower, which is reliable, simply to be performed and reliable and further has sufficient accuracy.

SUMMARY

According to an embodiment of the present invention it is provided a method of determining an inclination angle (in particular relative to a vertical direction) of a wind turbine tower at which a nacelle is mounted, the method comprising measuring plural acceleration values of an acceleration of the nacelle in a predetermined direction relative to the nacelle for plural yawing positions of the nacelle and deriving the inclination angle based on the plural acceleration values.

The inclination angle may be defined to be an angle of a longitudinal axis of the wind turbine tower and a vertical direction which points in the direction of the gravitational force due to the earth gravity field. The wind turbine tower may be erected and installed at the surface of the earth or may be erected or installed offshore on a basement in the sea.

The nacelle may be mounted on top of the wind turbine tower and may have one or more accelerometers installed. The accelerometer(s) may be fixed relative to the nacelle. The predetermined direction (for example along which the accelerometer measures the acceleration) may for example be in the longitudinal direction of the nacelle or in a direction orthogonal to the longitudinal direction of the nacelle or in a direction between the direction parallel to the longitudinal direction and the direction orthogonal to the longitudinal direction of the nacelle. For example, a conventionally available accelerometer may be employed to perform the measurements of the plural acceleration values.

Depending on the yawing position of the nacelle, the measured acceleration may change, in particular according to a trigonometric function. From the shape of a curve representing for example filtered acceleration values in dependence of the yawing positions, the inclination angle may be derived. Thus, no additional equipment may be necessary to determine the inclination angle. Namely, an accelerometer may be conventionally installed in the nacelle of the wind turbine. Furthermore, a processor may be available which may be programmed to perform the method of determining the inclination angle. Thus, the method is simple to implement, can be performed without interfering in the operation of the wind turbine and may have sufficient reliability and accuracy.

According to an embodiment of the present invention, the method further comprises measuring further plural acceleration values of an acceleration of the nacelle in a further predetermined direction relative to the nacelle for the plural yawing positions of the nacelle and deriving the inclination angle further based on the further plural acceleration values.

The further predetermined direction may for example be orthogonal to the predetermined direction. Conventionally, even a 3D accelerometer may be available or installed in the nacelle. The 3D accelerometer may be capable of measuring accelerations in different directions. When using also the further plural acceleration value, the determination of the inclination angle may be more accurate and/or more reliable. Thereby, the method may be improved.

According to an embodiment of the present invention, the method further comprises deriving an orientation/direction of the inclination of the wind turbine tower based on the plural acceleration values.

The orientation or direction of the inclination may for example be characterized by a particular azimuthal angle, i.e. an angle of a rotation around the yawing axis (or longitudinal direction of the wind turbine tower). The direction of the inclination may for example be detected by determining a phase angle in a trigonometric function fitted or adapted to the plural acceleration values. When the orientation or direction of the inclination is determined, appropriate counter measures may be applied to avoid damage of components of the wind turbine.

According to an embodiment of the present invention, the deriving the inclination angle comprises averaging plural groups of the acceleration values associated with plural yawing position ranges to obtain for each yawing position range an associated averaged acceleration value and deriving the inclination angle based on the averaged acceleration values.

This embodiment may also be referred to as a binning method. Each group of the plural groups may represent one bin of plural bins. Acceleration values in one bin may be averaged to reduce noise and/or an influence of a possible oscillation of the wind turbine tower. The averaged acceleration values may be plotted against the yawing positions. The shape of this curve may contain information regarding the inclination angle as well as information regarding the orientation or direction of the inclination angle. The average acceleration values may also represent filtered acceleration values. By filtering out noise and/or oscillations of the wind turbine tower, the method may further be improved.

According to an embodiment of the present invention, the deriving the inclination angle comprises deriving a mean acceleration value by averaging the plural acceleration values over all yawing positions, calculating plural acceleration differences between the averaged acceleration values and the mean acceleration value, determining a maximum and a minimum of the acceleration differences, determining a difference between maximum and minimum and deriving an inverse of a trigonometric function using a quantity proportional to the difference as an argument, to obtain the inclination angle.

These method steps may in particular be applied further to the binning method. By using these method steps, the amplitude of a periodic function, such as a trigonometric function, may be reliably calculated. The amplitude may represent a function of the inclination angle. Thereby, the inclination angle may reliably and in a simple manner be determined.

According to an embodiment of the present invention, the deriving the inclination angle comprises fitting a trigonometric function, in particular cosine or sine function, on the plural acceleration values, and deriving the inclination angle based on an amplitude of the trigonometric function.

For fitting the trigonometric function, the raw acceleration data or some kind of filtered acceleration data may be used. From theoretical considerations it is expected that the plural acceleration values, in particular when filtered, follow a sine function or a cosine function. Amplitude and phase of the sine or cosine function may relate to the magnitude of the inclination angle and the orientation or direction of the inclination angle. Thereby, the method can be easily performed.

According to an embodiment of the present invention, the different yawing positions cover samples of one or more circumferences, in particular at least 360°, of a rotation of the nacelle around an axis running along a longitudinal direction of the wind turbine tower.

When a full circumference is sampled, it may be ensured that the amplitude and the phase of the sine or cosine function may be reliably derived. However, if only a portion of a full circumference of acceleration values is available, at least an estimation of the inclination angle may be obtainable. In other embodiments, more than one round, such as two rounds, three rounds, four rounds or even more rounds (in particular n times 360°) of yawing positions may be run through while the acceleration of the nacelle is measured and stored. Then, an advantageous averaging may be performed to reduce noise and scatter and to thus enable to derive the inclination angle with even higher accuracy.

According to an embodiment of the present invention, the method is performed during a cable untwist operation. A cable untwist operation may conventionally be performed between two times and ten times per month in order to untwist cables which run from the wind turbine tower (which is fixed) to the nacelle (which normally rotates to adjust the wind turbine blades to face the wind direction which is constantly changing). Thus, no particular yawing actions (which are not performed regularly during normal operation) of the nacelle are necessary to perform the method. Thereby, interference of the method with the normal operation of the wind turbine may further be reduced.

According to an embodiment of the present invention, the nacelle is continuously rotated around a yawing axis while the accelerations are measured. In other embodiments, the nacelle may be rotated in a stepwise manner around the yawing axis and the acceleration may be measured at every step or after n times a step.

According to an embodiment of the present invention, the predetermined direction (along which the acceleration is measured) is substantially parallel to a longitudinal direction of the nacelle, the further predetermined direction is substantially orthogonal to a longitudinal direction of the nacelle. Thereby, a conventionally installed accelerometer may be utilized for performing the method. Thereby, costs may be reduced.

According to an embodiment of the present invention, the measuring the plural acceleration values is performed using an accelerometer installed at the nacelle. The accelerometer may be a conventionally available accelerometer.

According to an embodiment of the present invention it is provided a method of monitoring a wind turbine, the method comprising performing a method according to one of the preceding embodiments, and raising an alarm, shutting down the wind turbine, if the determined inclination angle exceeds a threshold.

Features, individually or in any combination, disclosed, described, applied or employed for a method of determining an inclination angle of a wind turbine tower may also, individually or in any combination, applied to, performed or provided for an arrangement for determining an inclination angle of a wind turbine tower according to embodiments of the present invention and vice versa.

According to an embodiment of the present invention it is provided an arrangement for determining an inclination angle (e.g. relative to a vertical direction) of a wind turbine tower at which a nacelle is mounted, the arrangement comprising an accelerometer adapted to measure plural acceleration values of an acceleration of the nacelle in a predetermined direction relative to the nacelle for plural yawing positions of the nacelle, and a processor adapted to derive the inclination angle based on the plural acceleration values.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Figure 2:
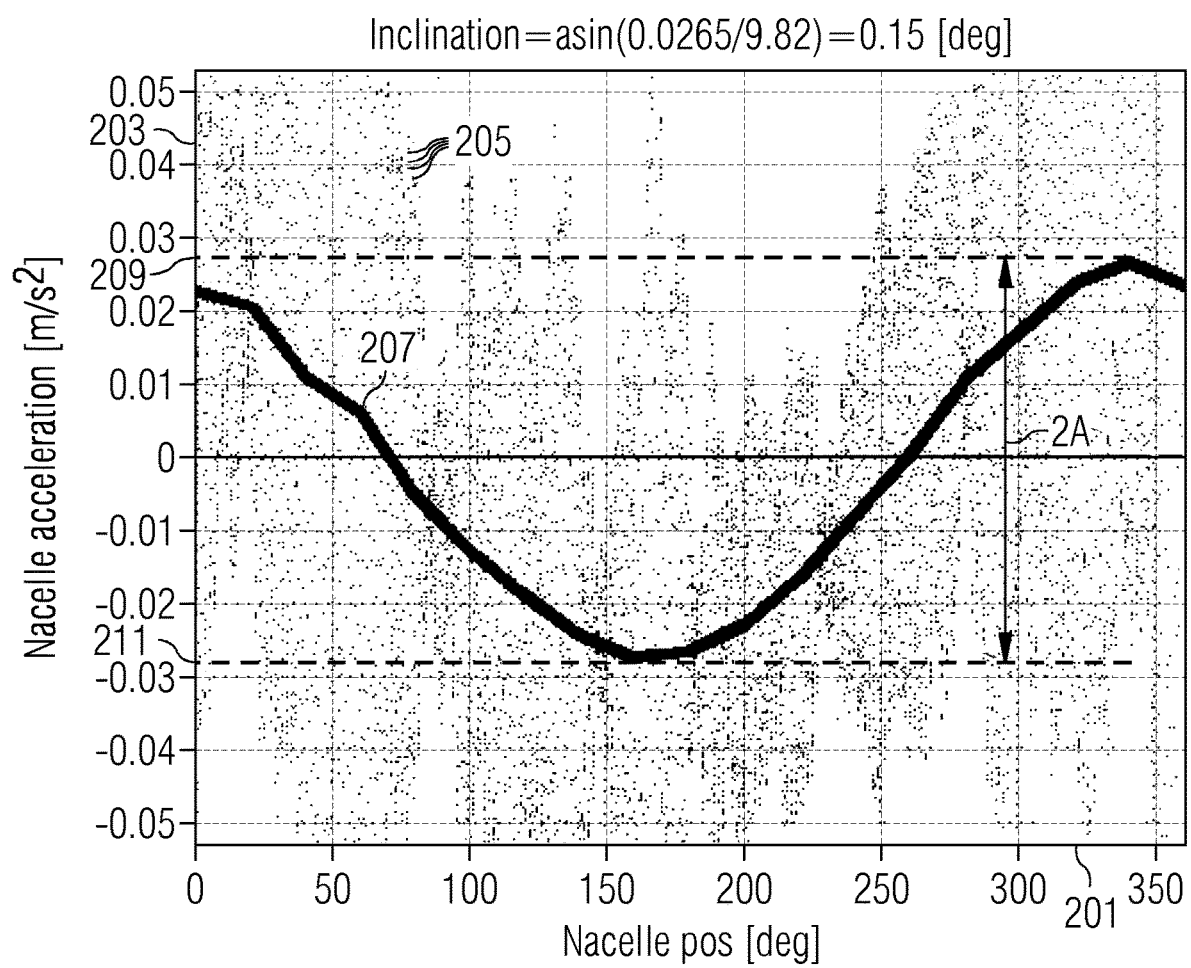

Some of the embodiments will be described in detail, with reference to the following figures, wherein like designations denote like members, wherein:

FIG. 1 schematically illustrates a wind turbine including a nacelle with an arrangement for determining an inclination angle according to an embodiment of the present invention; and FIG. 2 illustrates a graph as considered in a method of determining an inclination angle of a wind turbine tower according to an embodiment of the present invention which may for example be performed by the arrangement illustrated in FIG. 1.

DETAILED DESCRIPTION

The illustration in the drawings is in schematic form.

Illustrated in FIG. 1 is a wind turbine 100 according to an embodiment of the present invention including a nacelle 105 with an arrangement 101 for determining an inclination angle (relative to a vertical direction 104) of a wind turbine tower 103 according to an embodiment of the present invention. The wind turbine 100 comprises a nacelle 105, the wind turbine tower 103, the foundation 102, and rotor blades 107 connected to a not illustrated rotation shaft which drives a generator to generate electric energy.

The arrangement 101 (here installed in the nacelle 105) comprises an accelerometer 109 and further a processor 111. The accelerometer 109 is adapted to measure plural acceleration values of an acceleration of the nacelle 105 in a predetermined direction 113 (in the illustrated embodiment the longitudinal direction of the nacelle) relative to the nacelle for plural yawing position of the nacelle. The processor 111 is adapted to derive the inclination angle 'Inc' based on the plural acceleration values.

For adjusting the nacelle in the plural different yawing directions or yawing positions, the nacelle 105 is turned around (yawed around) the yawing axis 115 which substantially runs along a longitudinal axis of the wind turbine tower 103. The arrangement 101 is adapted to perform a method of determining an inclination angle 'Inc' of the wind turbine tower 103 by measuring plural acceleration values of an acceleration of the nacelle 105 in a predetermined direction 113 relative to the nacelle 105 for plural yawing positions Nac_pos of the nacelle 105 and by deriving the inclination angle 'Inc' based on the plural acceleration values.

In FIG. 1, 'Ag' denotes the gravity acceleration (9.82 m/s², and 'Ay' is the acceleration measured by the accelerometer 111 in the direction 113 which is fixed relative to the nacelle 105. 'Inc' is the maximum inclination in all nacelle positions. 'Nac_pos' is the nacelle position (also called yaw position) relative to North, i.e. an arbitrary direction.

The acceleration Ay is measured by the accelerometer 111 and according to the method for determining the inclination angle, the inclination is extracted from nacelle acceleration measurements, while the turbine is performing for example a cable untwist operation. The accelerometer 101 is for example placed within or at the nacelle 105 to measure Ay according to FIG. 1. The measured nacelle acceleration Ay can be expressed by:

$$Ay = Ag^* \sin(\text{Inc})^* \sin(\text{Nac\_pos} + k) + \text{offset} + \text{vibrations}$$

Therein, 'offset' is the sensor offset which is steady over a shorter time and 'vibrations' are representing accelerations caused by movements of the tower. These vibrations have a zero mean value. While the turbine is performing a cable untwist, it may yaw more than one round which will give data points for Nac_pos from 0 to 360°.

According to an embodiment of the present invention, a binning method is utilized to reduce noise and vibrations and scatter in the measured acceleration data. By averaging A y in bins of nacelle positions, the vibrations will be filtered out, as indicated by the next equation.

$$Ay\_\text{filtered} = \text{BinData}(\text{Nac\_pos}, Ay, 0:360) = \sim Ag^* \sin(\text{Inc})^* \sin(\text{Nac\_pos} + k) + \text{offset}$$

The offset can be subtracted as it is the mean value of the binned data:

$$Ay\_\text{UnBiased} = Ay\_\text{filtered} - \text{mean}(Ay\_\text{filtered}) = \sim Ag^* \sin(\text{Inc})^* \sin(\text{Nac\_pos} + k)$$

The inclination can then be calculated by applying an inverse of the sine function to the relation between the amplitude of this signal and the gravity acceleration:

FIG. 2 illustrates a graph in a coordinate system having an ordinate 201 indicating the nacelle positions in degree and having an ordinate 203 indicating the nacelle acceleration as measured by the accelerometer 111. The scatter points 205 represent the raw measured acceleration values of the nacelle 105 along the direction 113. The scattered data 205 comprise noise and vibrations and are filtered according to the embodiments of the present invention to derive filtered acceleration values or averaged acceleration values 207. As can be appreciated from FIG. 2, the curve 207 resembles a sine curve shifted by a particular phase-shift. The phase-shift k in the equation above comprises information regarding the direction/orientation of the inclination angle. The amplitude A of the curve 207, i.e. half of the difference 2A between the maximum 209 and the minimum 211, is related to the inclination angle. By taking the inverse of half the difference 2A between the maximum 209 and the minimum 211 of the curve 207, the inclination angle Inc can be determined. The measured inclination can then be compared to a defined threshold and an alarm can be raised if the inclination exceeds this threshold. The accuracy of the method may be in the range of 0.01°.

Embodiments of the present invention may enable to monitor the inclination of the wind turbine tower and foundations without any manual operations. This may have the advantage during the takeover process after commissioning, where it has to be verified that the inclination is within the tolerance limits. It has also an advantage relative to continuously monitoring the inclination where an early warning can be set before for example a scaur projection on the foundation needs repair.

Compared to the manual methods which are conventionally employed with for example spirit levels, the embodiments of the present invention may save efforts and maintenance personnel and may not be dependent on the actual weather conditions.

The inclination monitoring function may be placed in the turbine controller or it can be done offline from a central workstation or in a park controller.

The signal processing by the for example processor 111 may also comprise a fitting procedure to fit a sine function to the raw or filter data instead of employing the binning method as detailed above.

A dual axis accelerometer (e.g. for measuring accelerations Ax and Ay in directions x and y) placed in the nacelle may provide even higher accuracy. In this case, the data may be fitted to a model for example $$Ay = Ag^* \sin(\text{Inc})^* \sin(\text{Nac\_pos} + k)$$

$$Ax = Ag^* \sin(\text{Inc})^* \cos(\text{Nac\_pos} + k)$$

The orientation of the inclination relative to North may by be extracted by finding the best fit of the parameter k to the data set. This might be useful for the foundation inspection planning.

The cable untwist may be forced so it is not necessary to wait for an untwisting event.

A monitoring function may check the inclination during every cable untwist event and set a warning in the turbine lock in case of excessive inclination.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a wind turbine, including determining an inclination angle of a wind turbine tower at which a nacelle is mounted, the method comprising:
rotating the nacelle around a yawing axis, wherein the rotating comprises multiple rotations around the yawing axis;
measuring plural acceleration values of an acceleration of the nacelle in a predetermined direction relative to the nacelle for plural yawing positions of the nacelle, wherein the measuring occurs during the rotating of the nacelle around the yawing axis and without stopping the nacelle at any yawing position of the nacelle during the multiple rotations around the yawing axis;
deriving the inclination angle based on the plural acceleration values, the deriving the inclination angle comprising:
averaging acceleration values in each yawing position bin of a plurality of yawing position bins to obtain for each yawing position bin an associated averaged acceleration value in which noise and oscillations have been filtered out;
deriving the inclination angle based on the averaged acceleration values in which noise and oscillations have been filtered out, and
shutting down the wind turbine if the determined inclination angle exceeds a threshold.

2. The method according to claim 1, further comprising:
measuring further plural acceleration values of an acceleration of the nacelle in a further predetermined direction relative to the nacelle for the plural yawing positions of the nacelle;
deriving the inclination angle further based on the further plural acceleration values.

3. The method according to claim 1, further comprising:
deriving an at least one of an orientation and a direction of the inclination of the wind turbine tower based on the plural acceleration values.

4. The method according to claim 1, wherein the deriving the inclination angle comprises:
deriving a mean acceleration value by averaging the plural acceleration values over all yawing positions;
calculating plural acceleration differences between the averaged acceleration values and the mean acceleration value;
determining a maximum and a minimum of the acceleration differences;
determining a difference between maximum and minimum and deriving an inverse of a trigonometric function using a quantity proportional to the difference as an argument, to obtain the inclination angle.

5. The method according to claim 1, wherein the deriving the inclination angle comprises:
fitting a trigonometric function, including a cosine function or a sine function, on the plural acceleration values;
deriving the inclination angle based on an amplitude of the trigonometric function.

6. The method according to claim 1, wherein the different yawing positions cover samples of one or more circumferences, including at least 360°, of a rotation of the nacelle around an axis running along a longitudinal direction of the wind turbine tower.

7. The method according to claim 1, performed during a cable untwist operation.

8. The method according to claim 2, wherein the predetermined direction is substantially parallel to a longitudinal direction of the nacelle,
the further predetermined direction is substantially orthogonal to the longitudinal direction of the nacelle.

9. The method according to claim 1,
wherein the measuring of the plural acceleration values is performed using an accelerometer installed at the nacelle.

10. An arrangement for operating a wind turbine and determining an inclination angle relative to a vertical direction of a wind turbine tower at which a nacelle is mounted, the arrangement comprising:
an accelerometer adapted to measure plural acceleration values of an acceleration of the nacelle in a predetermined direction relative to the nacelle for plural yawing positions of the nacelle, wherein the accelerometer measures the plural acceleration values during a continuous rotation of the nacelle around a yawing axis, the continuous rotation of the nacelle comprising multiple rotations around the yawing axis, wherein the nacelle is not stopped at any of the plural yawing positions of the nacelle during measuring;
a processor adapted to derive the inclination angle based on the plural acceleration values, the derivation comprising:
averaging acceleration values in each yawing position bin of a plurality of yawing position bins to obtain for each yawing position bin an associated averaged acceleration value in which noise and oscillations have been filtered out; and
deriving the inclination angle based on the averaged acceleration values.

11. A wind turbine, including:
a nacelle;
a wind turbine tower having rotatable supported the nacelle on top; and
an arrangement for operating the wind turbine and determining an inclination angle relative to a vertical direction of the wind turbine tower at which the nacelle is mounted, the arrangement comprising:
an accelerometer adapted to measure plural acceleration values of an acceleration of the nacelle in a predetermined direction relative to the nacelle for plural yawing positions of the nacelle, wherein the accelerometer measures the plural acceleration values during a continuous rotation of the nacelle around a yawing axis, the continuous rotation of the nacelle comprising multiple rotations around the yawing axis, wherein the nacelle is not stopped at any of the plural yawing positions of the nacelle during measuring;
a processor adapted to derive the inclination angle based on the plural acceleration values, the derivation comprising:
averaging acceleration values in each yawing position bin of a plurality of yawing position bins to obtain for each yawing position bin an associated averaged acceleration value in which noise and oscillations have been filtered out; and deriving the inclination angle based on the averaged acceleration values.

\* \* \* \* \*